United States Patent
Ng et al.

(10) Patent No.: US 10,515,220 B2
(45) Date of Patent: *Dec. 24, 2019

(54) DETERMINE WHETHER AN APPROPRIATE DEFENSIVE RESPONSE WAS MADE BY AN APPLICATION UNDER TEST

(71) Applicant: ENTIT SOFTWARE LLC, Sanford, NC (US)

(72) Inventors: Sam Ng, Hong Kong (CN); Ronald J. Sechman, Alpharetta, GA (US); Matias Madou, Diegem (BE)

(73) Assignee: MICRO FOCUS LLC, Santa Clara, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/500,523

(22) PCT Filed: Sep. 25, 2014

(86) PCT No.: PCT/US2014/057419
§ 371 (c)(1),
(2) Date: Jan. 30, 2017

(87) PCT Pub. No.: WO2016/048322
PCT Pub. Date: Mar. 31, 2016

(65) Prior Publication Data
US 2017/0220805 A1    Aug. 3, 2017

(51) Int. Cl.
*H04L 29/06*    (2006.01)
*G06F 21/57*    (2013.01)
*G06F 11/36*    (2006.01)
*G06F 21/52*    (2013.01)

(52) U.S. Cl.
CPC ........ *G06F 21/577* (2013.01); *G06F 11/3692* (2013.01); *G06F 21/52* (2013.01); *H04L 63/1433* (2013.01); *G06F 2221/033* (2013.01)

(58) Field of Classification Search
CPC ......... G06F 21/577; G06F 21/33; G06F 21/52
USPC ............................................. 726/25
See application file for complete search history.

(56) References Cited

U.S. PATENT DOCUMENTS

| | | | |
|---|---|---|---|
| 5,974,549 A * | 10/1999 | Golan | G06F 9/468 714/47.3 |
| 7,237,265 B2 | 6/2007 | Reshef et al. | |
| 8,495,747 B1 | 7/2013 | Nakawatae et al. | |
| 9,195,829 B1 * | 11/2015 | Goradia | G06F 11/3608 726/23 |
| 9,824,209 B1 * | 11/2017 | Ismael | G06F 21/54 726/23 |
| 2008/0028470 A1 * | 1/2008 | Remington | G06F 21/33 726/25 |

(Continued)

FOREIGN PATENT DOCUMENTS

WO    WO-2008011576 A2    1/2008

OTHER PUBLICATIONS

McAllister, S., et al., "Leveraging User interactions for In-depth Testing of Web Applications", https://www.cs.ucsb.edu/~chris/research/doc/raid08_xss.pdf16 Jun. 2008, 19 pgs.

*Primary Examiner* — Haresh N Patel

(57) ABSTRACT

Example embodiments disclosed herein relate to determining a secure activity of an application under test (AUT). Execution of an application under test is monitored. During an attack vector, an application programming interface associated with a secure activity is determined. A message is sent to a security test that secure activity occurred.

20 Claims, 4 Drawing Sheets

(56) References Cited

U.S. PATENT DOCUMENTS

| | | |
|---|---|---|
| 2008/0209567 A1 | 8/2008 | Lockhart et al. |
| 2009/0055910 A1* | 2/2009 | Lee .................. G06F 21/46 726/6 |
| 2009/0216910 A1* | 8/2009 | Duchesneau ......... G06F 9/5072 709/250 |
| 2009/0282480 A1* | 11/2009 | Lee .................. G06F 21/52 726/22 |
| 2010/0071053 A1* | 3/2010 | Ansari ................ G06Q 30/04 726/12 |
| 2011/0231936 A1 | 9/2011 | Williams et al. |
| 2012/0072968 A1 | 3/2012 | Wysopal et al. |
| 2012/0157512 A1* | 6/2012 | Ben-Chanoch ...... C12N 15/113 514/44 A |
| 2012/0258646 A1* | 10/2012 | Sela .................. A61K 31/713 449/2 |
| 2013/0160130 A1* | 6/2013 | Mendelev ............ G06F 21/56 726/25 |
| 2013/0160131 A1* | 6/2013 | Madou ............... G06F 11/3688 726/25 |
| 2013/0205019 A1* | 8/2013 | Oellermann ........ H04L 41/5038 709/224 |
| 2013/0238785 A1* | 9/2013 | Hawk .................. G06F 9/5072 709/224 |
| 2014/0082739 A1* | 3/2014 | Chess .................. G06F 21/577 726/25 |
| 2014/0123295 A1 | 5/2014 | Kuykendall et al. |
| 2014/0237594 A1* | 8/2014 | Thakadu ....................... 726/23 |
| 2014/0237606 A1 | 8/2014 | Futoransky et al. |
| 2015/0074259 A1* | 3/2015 | Ansari .................. H04L 67/02 709/224 |
| 2015/0264074 A1* | 9/2015 | Mendelev ........... G06F 11/3672 726/25 |
| 2015/0347683 A1* | 12/2015 | Ansari .................. H04L 63/08 726/7 |
| 2016/0267277 A1* | 9/2016 | Muthurajan .......... G06F 21/577 726/23 |
| 2017/0103211 A1* | 4/2017 | Madou .................. G06F 21/577 726/23 |
| 2017/0220804 A1* | 8/2017 | Muthurajan ............ G06F 21/52 726/23 |

* cited by examiner

DETERMINE WHETHER AN APPROPRIATE DEFENSIVE RESPONSE WAS MADE BY AN APPLICATION UNDER TEST

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making Hypertext Transfer Protocol (HTTP) requests and evaluating the HTTP responses in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses.

BRIEF DESCRIPTION OF THE DRAWINGS

The following detailed description references the drawings, wherein.

DETAILED DESCRIPTION

Figure 1:
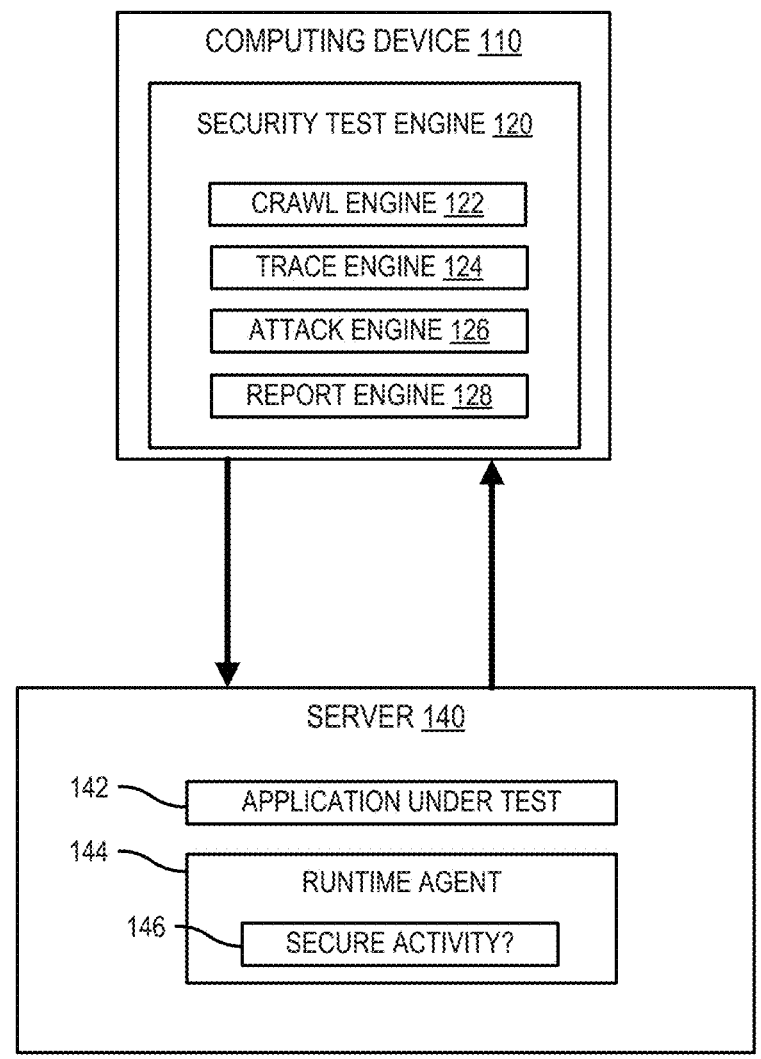
FIG. 1 is a block diagram of a system capable of determining a secure activity of an application under test, according to one example.

A web application vulnerability scanner is an approach for identifying vulnerabilities in a web application. A scanner starts by crawling the application under test (AUT) to identify the attack surface. A runtime agent or observer can be installed on the application server to assist with identifying the attack surface more accurately. As described herein, a software program referred to herein as an observer or runtime agent is used to watch the internal operations performed by the AUT. The runtime agent enables the scanner to determine the operation of the AUT and how it behaves in response to attacks. The runtime agent can also enable the scanner to determine the behavior of the AUT in response to normal application requests, which the scanner may use to determine what types of attacks to send. The scanner continues to deliver attacks to the AUT, and the scanner receives knowledge of the internal workings of the AUT from the runtime agent. In this way, the scanner can find more vulnerabilities and produce better vulnerability reports, thereby providing a more comprehensive and detailed software security test of web-based applications.

Automated vulnerability scanners show vulnerabilities that are detected in applications. However, this does not necessarily mean that other vulnerabilities are not present. This means that the particular vulnerabilities were found. Absence of evidence is not evidence of absence. Therefore, if an automated vulnerability scanner does not find a particular type of security vulnerability in an application, it does not mean the application does not have that type of vulnerability. If a scanner can provide more information or hints on why a particular vulnerability is not found, that will definitely increase the trustworthiness of the security report.

Moreover, many secure coding guidelines include both a negative section (e.g., vulnerabilities to avoid) and a positive section (e.g., what the program should do, such as input validation). However, vulnerability scanners report vulnerabilities, not positive actions. Thus auditors are forced to use some other methods, such as manual code review to verify if the application complies with the corporate policy.

Accordingly, various embodiments described herein relate to determining and reporting positive secure activity that an application under test (AUT) performs. These reports can be sent to developers to improve their applications using by re-enforcing positive activities used by developers. This can help strengthen future applications developed by the developers as well as help provide information to remedy vulnerabilities in the current applications.

Furthermore, by knowing the security controls implemented in the application (e.g. the input validation patterns), the scanner can eliminate attack vectors that are known to be blocked by the security controls and can more quickly find out attack vectors that are more likely to success. Therefore, the overall scan can be improved.

Positive feedback can help change the culture of web application development. The focus of security analysis has been on the negative aspects of the software under test. For example, common findings are Injection vulnerabilities, weak encryption routines, or weaknesses to known security advisories such as those represented via MITRE's Common Vulnerabilities and Exposures (CVE)'s. While there is certainly good reason to focus on fortifying software to be secure, positive aspects of the application are an opportunity to both evangelize the effective security controls to software developers so that they may be incorporated uniformly across other applications within the organization as well as justify intangible metrics such as overall scan time, quality, and thoroughness that often serve as critical evaluation points for automated vulnerability analysis tools.

From a business perspective, providing a report of positive feedback can be used to show an application security testing customer that a vulnerability report with less found vulnerabilities were caused by good coding rather than an inability in a scanner. Further, in many cases, reports resulting from professional security engagements are used as key inputs on business decisions, including whether to mark software as compliant according to corporate policy, or refrain from releasing software altogether due to poor results. Including effective security controls within the software under test could have a dramatic impact on these and other important business decisions when included in a holistic representation of respective security postures of an organization.

A runtime agent can be responsible for identifying the usage of particular application programming interfaces (APIs) while the scanner executes attack vectors on the AUT. The runtime agent can provide that information to the scanner. When the scanner performs an attack vector, positive feedback can be shown in the vulnerability report. In some examples, the positive feedback can be shown when the attack does not find a vulnerability corresponding to the attack vector used.

FIG. 1 is a block diagram of a system capable of determining a secure activity of an application under test, according to one example. Computing system 100 can include a computing device 110 and server 140 include components that can be utilized to perform a security test. In some examples, the computing device 110 can perform the functionality of a web application scanner. The respective devices 110, 140 may be a notebook computer, a desktop computer, a server, a workstation, or any other computing device capable of performing the recited functionality. In certain examples, a server is a system that can respond to requests over a computer network to provide or help provide a network service. Further, in certain examples, the computing device 110 can include a security test engine 120, which may further include a crawl engine 122, a trace engine 124, an attack engine 126, and a report engine 128. Further, the server 140 may include an application under test 142, a runtime agent 144, and determine whether secure activity 146 is present in the AUT 142. Communications between the computing device 110 and the server 140 may be conducted using a request-response protocol such as the HyperText Transfer Protocol (HTTP). As noted, the server 140 can host the AUT 142.

The runtime agent 144 can monitor execution of the AUT 142 during a dynamic security test implemented by the security test engine 120. Further, the runtime agent 144 can instrument predefined APIs of the AUT 142. This can be done during application start up (e.g., via load-time weaving), an offline process (e.g., compile-time weaving), etc. As an example, in order to provide positive feedback for various vulnerabilities, the runtime agent 144 may monitor the following APIs of Table 1:

TABLE 1

| Vulnerability Category | Positive secure activity | Example Java APIs |
|---|---|---|
| Multiple | Input Validation | java.sql.Pattern.matcher( . . . ) org.apache.struts.validator.FieldChecks.validate*( ) |
| SQL Injection | SQL query via prepared statement | java.sql.Statement.prepareStatement( . . . ) |
| SQL Injection | SQL query via Hibernate framework | org.hibernate.Session.get( . . . ) |
| SQL Injection | Escape Apostrophe | java.lang.String.replace("'", "''") |
| Cross-site Scripting | HTML Escaping | org.apache.commons.lang.StringEscapeUtils escapeHtml( ) |
| Command Injection | Execute with Argument Array | java.lang.Runtime.exec(String[ ]) |
| Insecure Randomness | Use cryptographic strong random number | java.security.SecureRandom.getInstance ( . . . ) |
| Header Manipulation | Escape new line | java.lang.String.replace("\n", . . . ) |
| Path Manipulation | Get base filename | org.apache.commons.io.FilenameUtils.get Name( . . . ) or getBaseName( . . . ) |

Other APIs can be correlated to secure activities and monitored as well. Here, examples can include Structured Query Language (SQL) injection, cross-site scripting, command injection, insecure randomness, header manipulation, path manipulation, combinations thereof, etc.

The security test engine 120 can perform security tests on the AUT, for example, a scan. As noted, the computing device 110 can be communicatively coupled to the AUT 142 via a common communication channel. In the crawl phase, the crawl engine 122 crawls the AUT 142, which allows the security test engine 120 to be able to identify an attack surface. This can be done by fetching attack surface information from the server-side runtime agent 144, following links, executing scripts, etc.

During an attack phase, the attack engine 126 can perform attack vectors on the AUT 142. The security test engine 120 may send a Hypertext Transfer Protocol (HTTP) request with a specific attack vector to verify if the AUT is vulnerable to the attack. For example, to test for SQL injection, the security test engine 120 can send an HTTP request with a parameter of value 'a' or "1=1 - - - ", etc. The security test engine 120 can embed extra information in the HTTP request header or via other communication channels as further described in FIG. 2 to provide information to the runtime agent 144 about scan parameters such as the current attack vector used, a vulnerability category under test, or the like. As such, the security test engine 120 can provide information about the attack vector to the runtime agent 144. This information can be used to determine APIs to monitor during the attack vector. This could be implemented by using a custom request header.

The runtime agent 144 can observe and record whether one or more pre-defined positive secure activities 146 are executed during the attack vector. These can be recorded when a monitored API is called during an attack vector. In some examples, the information can be collected by the runtime agent 144 and sent back to the security test engine 120 for processing.

In some examples, the runtime agent 144 can then perform further analysis. In one example, the security test engine 120 can send type information about the attack vector to the runtime agent. For example, the runtime agent 144 can determine a set of secure activities associated with the type information. The determination can be based on a data structure available to the runtime agent 144 that maps the type to the APIs associated with the secure activities.

For example, the type can be a SQL injection. The runtime agent 144 can check whether a query statement includes the attack vector(s) or not as part of a SQL attack vector. This information is sent back to the security test engine 120. If the attack is unsuccessful, the security test engine 120 can use the trace engine 124 to connect to the runtime agent 144 to retrieve security events (e.g., pre-defined secure APIs) that the runtime agent 144 may have been monitoring during the attack vector to determine if protection mechanisms or other secure activity are in place to prevent the attack from occurring. This information can be integrated into the user interface and reports to notify the user that the attack was unsuccessful along with other proof that defensive mechanisms were correctly applied. In certain examples, secure activity 146 can be predefined positive activity that the runtime agent 144 monitors for. The runtime agent 144 can report the secure activity 146 to the security test engine 120 via a message. The message may be embedded in other communication.

The report engine 128 can generate a vulnerability report. The report may include vulnerabilities. Further, the vulnerability report can also include positive secure activities performed by the AUT. In some examples, the secure activities found can be added to the report. Moreover, in some examples, the secure activities are added to the report if no vulnerabilities were found for the attack vector. As such, in some examples, the report can correlate the lack of finding a vulnerability during an attack vector to the positive secure activities associated with respective attack vectors.

Moreover, as noted above, the security test engine 120 can modify future attack vectors based on the secure activity. For example, if certain protections are found, the security test engine 120 may not need to retest using a particular attack vector. In one example, a protection can be marked as used with a particular function call associated with the AUT 142. The runtime agent 144 can provide information about stack traces to the security test engine 120. This information can be used to map one or more functions that are called. Thus, if an attack vector entering information to a particular field shows that a particular positive activity is used and the functions that are called in the chain, this information can be correlated to determine that other attack vectors protected by the same positive secure activity need not be used on the same field. Similarly, attack vectors to other fields may be correlated based on stack traces and positive activity associated with functions.

The engines, modules, and parts described herein can be distributed between one or more devices. The engines 120, 122, 124, 126, 128 include hardware and/or combinations of hardware and programming to perform functions provided herein. Moreover, modules can include programming functions and/or combinations of programming functions to be executed by hardware as provided herein. When discussing the engines and modules, it is noted that functionality attributed to an engine can also be attributed to a corresponding module and vice versa. Moreover, functionality attributed to a particular module and/or engine may also be implemented using another module and/or engine. Examples of modules and engines include the security test engine 120, crawl engine 122, trace engine 124, attack engine 126, report engine 128, application under test 142, and runtime agent 144.

A processor, such as a central processing unit (CPU) or a microprocessor suitable for retrieval and execution of instructions and/or electronic circuits can be configured to perform the functionality of any of the engines and/or modules described herein. In certain scenarios, instructions and/or other information, such as rules or criteria, can be included in memory. Input/output interfaces may additionally be provided by the devices. For example, input devices, such as a keyboard, a sensor, a touch interface, a mouse, a microphone, etc. can be utilized to receive input from an environment surrounding the devices. Further, an output device, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces.

Each of the engines/modules may include, for example, hardware devices including electronic circuitry for implementing the functionality described herein. In addition or as an alternative, each module may be implemented as a series of instructions encoded on a machine-readable storage medium of computing device and executable by a processor. It should be noted that, in some embodiments, some modules are implemented as hardware devices, while other modules are implemented as executable instructions.

Figure 2:
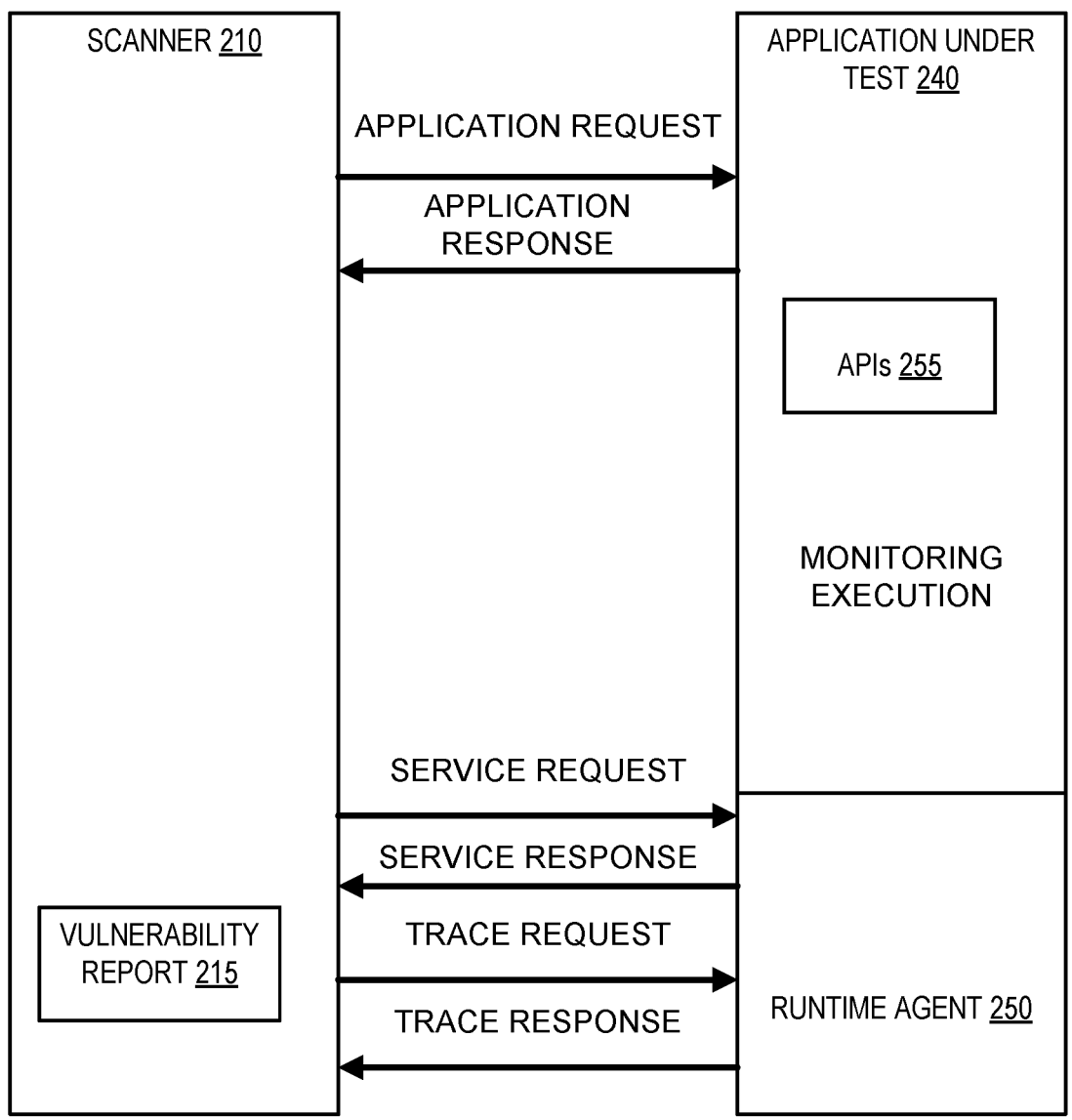
FIG. 2 is a block diagram of a system capable of determining and reporting a secure activity of an application under test, according to one example.

FIG. 2 is a block diagram of a system capable of determining and reporting a secure activity of an application under test, according to one example. The system 200 may include the scanner 210, the AUT 240, and a runtime agent 250. The runtime agent 250 can monitor APIs 255 of the AUT 240. In some examples, the AUT 240 can be instrumented to monitor the APIs 255 as discussed above. The scanner 210 can create a vulnerability report 215 to provide vulnerability information to a security professional.

The AUT 240 may be encoded in any suitable Web-based computer language, such as JAVA, or .NET, among others. The AUT 240 may operate within a suitable software framework, such as Struts, Struts 2, ASP.NET MVC, Oracle WebLogic, and Spring MVC, or the like. The software framework includes a set of common code modules that provide generic functionality, which can be selectively overridden or specialized by user code to providing specific functionality. The AUT 240 may be configured to execute one or more instances of a Java Virtual Machine (JVM), Common Language Runtime (CLR), other runtime environment for processing requests from the scanner 210. The programming instructions provided by the common code modules of the software framework or runtime environment may be referred to as container code. Custom programming instructions specific to the AUT 240 may be referred to as user code.

The AUT 240 can include a network interface for enabling communications between the scanner 210 and the AUT 240 through a network. The network interface exposes the attack surface of the AUT 240 and can be the same interface that would eventually be used to provide access to the AUT 240 when the AUT 240 is made available for general use. Communication between the scanner 210 and the AUT 240 over the network interface may be conducted through HTTP requests issued from the scanner 210 to the AUT 240 and HTTP responses issued from the AUT 240 to the scanner 210. Requests targeting the AUT 240 may be referred to as application requests, and responses received from the AUT 240 may be referred to as application responses. The application requests generated by the scanner 210 may be configured to expose potential vulnerabilities of the AUT 240.

The AUT 240 may be coupled to a file system, a database, and other resources used by the AUT 240. The database may include a variety of user information such as a table of usernames and passwords used to grant access to various resources of the AUT 240, for example. The file system may include data and programs used by the AUT 240, as well data which may be requested by a user such as HTTP pages, software programs, media files, and the like. The database may be part of a system including the AUT 240 and/or be external to the system. As noted above, APIs 255 can be instrumented. These APIs 255 can be instrumented for the runtime agent 250 to monitor the pre-defined APIs 255. In some examples, the pre-defined APIs 255 can be known to the scanner 210 and/or provided by the runtime agent 250 during the test.

The runtime agent 250 can operate within the execution environment of the AUT 240 and has access to the internal operations performed by the AUT 240. For example, the runtime agent 250, in certain examples, may modify the bytecode of the AUT 240 by injecting additional code, such as a JAVA class, at various program points. The injected code acts as a monitor that observes the AUT 240. The injected monitor code may be located at strategic program points in the AUT 240, for example, application programming interface (API) calls that perform specific operations such as reading a URL parameter or writing to the file system. Whenever such a program point in the AUT 240 is executed, the monitor calls into services provided by the runtime agent 250 to record operations performed by AUT 240. The runtime agent 250 may be coupled to a buffer for storing information that has been collected regarding the internal operations of the AUT 240. The buffer may be used to store data that has been collected but has not yet been reported to the scanner 210. The buffer may be stored in non-volatile storage medium such as a hard disk, solid state drive, and the like.

The runtime agent 250 may also include an additional network interface for enabling communications between the runtime agent 250 and the scanner 210 through the network. As noted above, both network interfaces may use the same communication channel, for example, the same HTTP channel. Communications between the scanner 210 and the runtime agent 250 may be implemented through the use of custom request and response headers. Custom headers may be added to the application requests by the scanner 210, and custom headers may be added to the application responses by the runtime agent 250. In this way, at least some of the communications between the scanner 210 and the runtime agent 250 may be piggy-backed on normal communications with the AUT 240.

The scanner 210 may add one or more custom headers to each application request, wherein the custom headers include information that the runtime agent 250 may use to diagnose a vulnerability related to an attack in progress. Information within the custom header can include information that a particular field of the AUT 240 should be marked as sensitive and that data entering the field should be tracked and information about whether that data was adequately protected reported back. Moreover, in some examples, the AUT custom header can include information that a particular data entered at a field should be tracked and information about whether that data was adequately protected reported back. As noted above, this can be in the form of an indication that the field should be considered sensitive by the runtime agent.

The scanner 210 may also use custom request headers to generate requests that target the runtime agent 250 to obtain additional information regarding the internal processes performed by the AUT 240, or information about AUT 240, the server, or the runtime agent 250. Requests targeting the runtime agent 250 may be referred to as service requests, and responses received from the runtime agent 250 may be referred to as service responses. Service responses issued by the runtime agent 250 may include supplemental information in the body of the service response, as described further below.

In various examples, the runtime agent 250 is configured to receive the application requests and the service requests sent from the scanner 210 to the AUT 240. The runtime agent 250 may then analyze the header information to determine whether the request is an application request or a service request. Upon receiving an application request, the runtime agent 250 may analyze the header information to acquire data used by the runtime agent 250 regarding the specific application request. Application requests may then be delivered by the runtime agent 250 to AUT 240 for processing by the AUT 240 according to the AUT's programming. When the AUT 240 generates the application response, the runtime agent 250 may add one or more custom headers to the application response to send additional information back to the scanner 210.

In some examples, per-request headers may be custom HTTP headers that include a custom field name followed by one or more field values that are understood by the runtime agent 250 and the scanner 210. In these examples, the custom HTTP headers are ignored by the AUT 240. It will be appreciated that the field names described herein are merely used as examples of field names that could be used in a particular implementation and are not intended to limit the scope of the claims.

In certain examples, the data entered in the field by the scanner 210 can be considered a probe. The runtime agent 250 can observe the APIs that are exercised by the probe. The runtime agent 250 can be aware of the probe based on a per-request header. For example, the per-request header may include a memo header used to coordinate the interaction between the scanner 210 and the runtime agent 250. In some examples, the scanner 210 may add a memo header probe and/or trace request. The runtime agent 250 may use the memo header identify an attack string associated with the probe. As an example, the memo header may be formatted as follows:

X-Scan-Memo: <AttackString>/<OtherInformation>

In response to an application request for a probe/trace, the runtime agent 250 may determine the effect of the application request by determining, for example, particular lines of code that have been executed by the AUT 240, files that have been accessed by the AUT 240, database queries executed by the AUT 240, or other information.

In particular, the data entered in a field can be monitored to determine where it goes. In some examples, this can be used in association with an attack vector to determine where the attack vector goes. For example, during a crawl, the scanner 210 can determine an attack surface of the AUT 240. The attack surface may include input fields. The attack vectors can be input into the fields and monitored using the agent, using blackbox techniques, etc. In some examples, the attack vector can be provided to the runtime agent 250 via a service request. Further, other information associated with the attack vector (e.g., a type of vulnerability it is checking for) can be provided. The information can be used by the runtime agent 250 to select one or more of the APIs 255 to look for during the attack. In other examples, the runtime agent 250 can monitor all of the APIs 255 that are pre-defined. The pre-defined APIs 255 can be associated with particular positive activities. Examples are shown on Table 1.

In one example, the scanner 210 can let the runtime agent 250 know that an attack vector associated with a particular activity is going to be used via a service request. The scanner 210 can determine via the attack whether there is a vulnerability associated. The scanner 210 can be helped by the runtime agent 250 to make the determination. In one example, if the scanner 210 can request the help via a trace request, where the runtime agent 250 can provide a trace response (e.g., a stack trace) via a trace response. Moreover, the scanner 210 may ask for secure activities (e.g., pre-defined APIs 255 used) from the runtime agent 250 (e.g., when there are no vulnerabilities found). Vulnerabilities can be reported in a vulnerability report 215 and stored via one or more data structures. The vulnerability report 215 can also include the secure activities. The secure activities may be provided in response to a determination that the attack vector did not find a vulnerability or added without the determination being made.

Each trace may include the Request ID of the application request and the application response that corresponds with the trace. The scanner 210 can learn about the internal operations of the AUT 240 that were triggered by a particular application request by retrieving the corresponding trace from the runtime agent 250. To retrieve a trace, the scanner 210 may issue a service request to the runtime agent 250 that includes a header field name/value pair configured to indicate the request of the trace corresponding to a particular application request or response, for example, for particular probes or sets of probes. For example, the field name/value pair for requesting a trace may be formatted as follows:

Trace=<request_id>

The value <request_id> is the value assigned by the scanner 210 or the runtime agent 250 that corresponds with the application request and/or application response associated with the requested trace. Upon receiving the trace service request, the runtime agent 250 may bypass the AUT 240 and generate a service response that includes the requested trace. In certain examples, the requested trace may be retrieved by the runtime agent 250 from the buffer and added to the body of the service response, which may then be sent to the scanner 210. Further, in some examples, the service response header includes the request_id value of the requested trace, and the body of the service response may be formatted as a JSON object.

The runtime agent 250 may monitor processes performed by the AUT 240 that occur outside the context of an application request, such as processes initiated by the additional monitor code injected by the runtime agent 250. To avoid incurring an unacceptable level of performance overhead, the runtime agent 250 may be configured to minimize the performance overhead of monitoring processes that are unrelated to application requests. For example, the performance overhead may be minimized by injecting the monitor code to selectively monitor specific API calls and relevant portions of the AUT's user code. Further, sets of the pre-defined APIs 255 to be monitored can be monitored based on particular attack vectors that may correspond to respective APIs 255.

Figure 3:
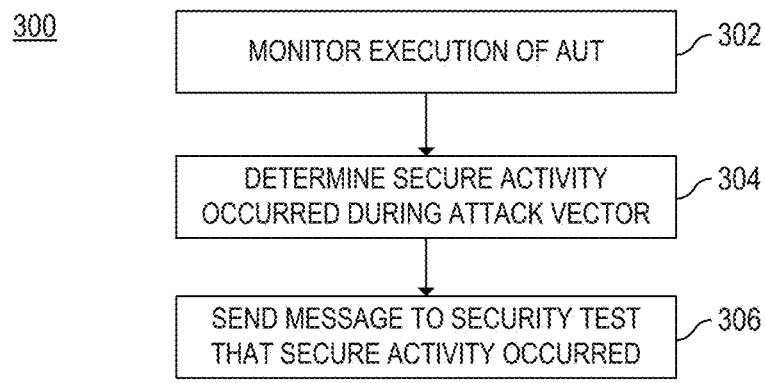
FIG. 3 is a flowchart of a method for monitoring execution of an application under test to determine secure activity of the application under test during an attack vector, according to one example.
Figure 4:
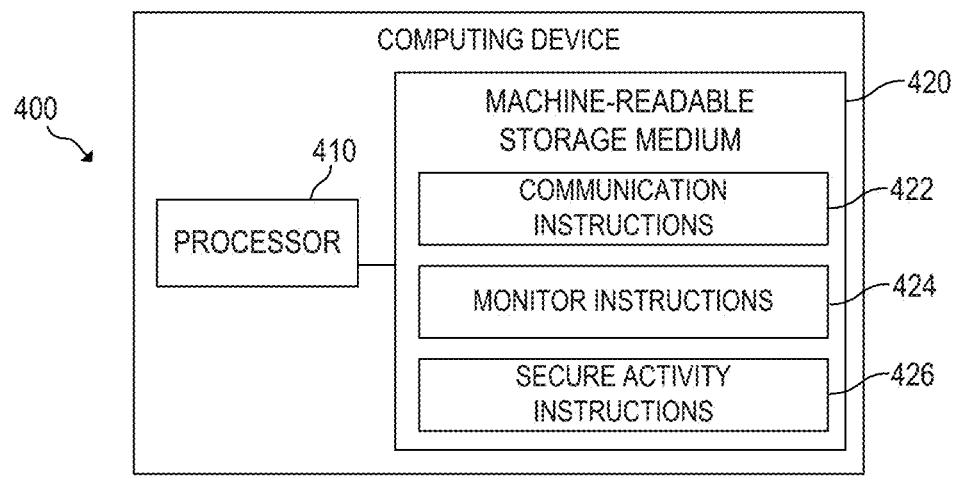
FIG. 4 is a block diagram of a computing device capable of monitoring execution of an application under test to determine secure activity of the application under test during an attack vector, according to one example.

FIG. 3 is a flowchart of a method for monitoring execution of an application under test to determine secure activity of the application under test during an attack vector, according to one example. FIG. 4 is a block diagram of a computing device capable of monitoring execution of an application under test to determine secure activity of the application under test during an attack vector, according to one example. Although execution of method 300 is described below with reference to computing device 400, other suitable components for execution of method 300 can be utilized (e.g., systems 100 and/or 200). Additionally, the components for executing the method 300 may be spread among multiple devices. Method 300 may be implemented in the form of executable instructions stored on a machine-readable storage medium, such as storage medium 420, and/or in the form of electronic circuitry.

The computing device 400 includes, for example, a processor 410, and a machine-readable storage medium 420 including instructions 422, 424, 426 for facilitating a security test on an AUT. Computing device 400 may be, for example, a notebook computer, a desktop computer, a workstation, a server, a slate computing device, or any other computing device capable of performing the functionality described herein.

Processor 410 may include, at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to implement method 300. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory.

The computing device 400 can host an application under test. The instructions 422, 424, 426 can be associated with a runtime agent. The runtime agent can implement monitor instructions 424 to monitor execution of the AUT (302) during a dynamic security test (e.g., a scan). A scanner or other security test engine can perform a security test on the AUT. Communication instructions 422 can be executed by processor 410 to communicate with the security test. The scanner can crawl the AUT and perform attack vectors. The runtime agent can use secure activity instructions 426 to monitor particular APIs associated with secure activity.

At 304, during an attack vector, the runtime agent can determine at least one API associated with secure activity implemented by the AUT. This can be in response to an indication from the scanner that the attack vector is to be performed on the AUT. In one example, the agent can receive, from the security test, a type of vulnerability that the attack vector is looking for. The agent can determine a set of secure activities associated with the type. APIs associated with the set can be monitored during the attack vector. This can help lower cost of implementing the runtime agent during the security test.

At 306, the runtime agent can execute communication instructions 422 to send a message to the dynamic security test that the secure activity occurred. In one example, the sending of the message is in response to a determination that the attack vector was unsuccessful. The determination can be made by the scanner. The scanner can then ask the runtime agent for the message including any secure activity. As noted above, the attack vector can include an attack of at least one of SQL injection, cross-site scripting, command injection, insecure randomness, header manipulation, and path manipulation. In other examples, an attack vector can be associated with multiple vulnerabilities and multiple sets of the APIs to be monitored can be monitored at the same time.

Figure 5:
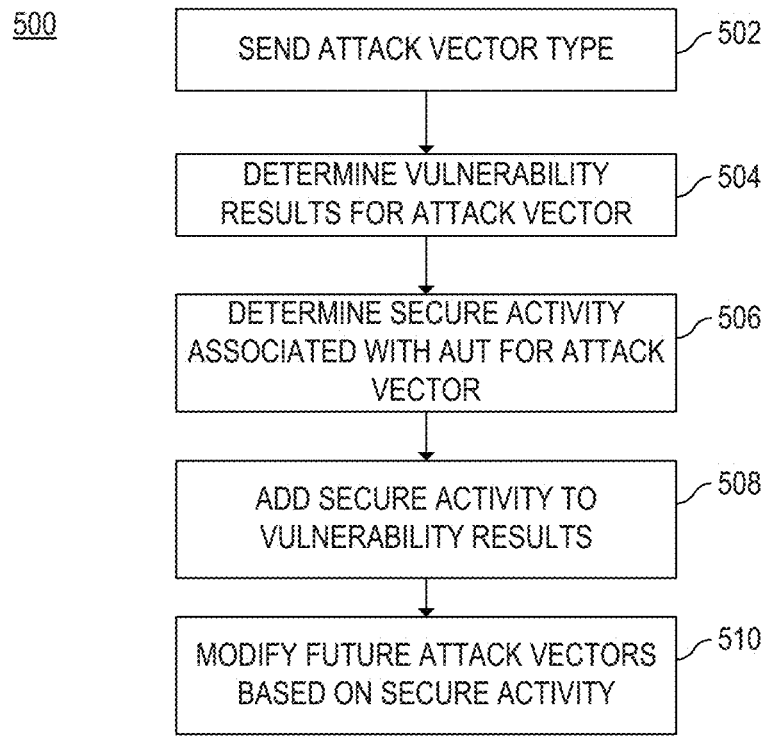
FIG. 5 is a flowchart of a method for determining secure activity associated with an application under test, according to one example.
Figure 6:
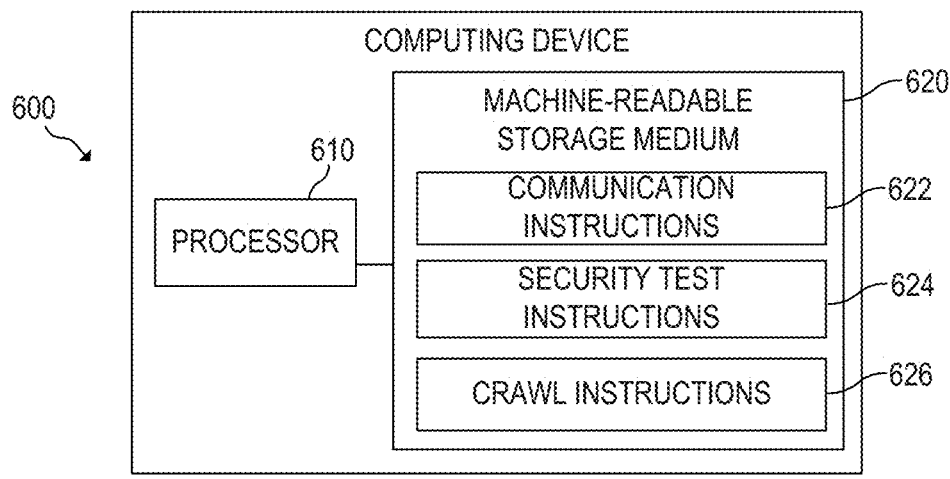
FIG. 6 is a block diagram of a computing device capable of determining secure activity associated with an application under test, according to one example.

FIG. 5 is a flowchart of a method for determining secure activity associated with an application under test, according to one example. FIG. 6 is a block diagram of a computing device capable of determining secure activity associated with an application under test, according to one example. Although execution of method 500 is described below with reference to computing device 600, other suitable components for execution of method 500 can be utilized (e.g., systems 100 and/or 200). Additionally, the components for executing the method 500 may be spread among multiple devices. Method 500 may be implemented in the form of executable instructions stored on a machine-readable storage medium, such as storage medium 620, and/or in the form of electronic circuitry.

The computing device 600 includes, for example, a processor 610, and a machine-readable storage medium 620 including instructions 622, 624, 626 for performing a security test on an AUT. Computing device 600 may be, for example, a notebook computer, a desktop computer, a workstation, a server, or any other computing device capable of performing the functionality described herein.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624, 626 to implement method 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for performing a security test based on attack suggestions.

A server can host an application under test. The computing device 600 can perform a security test on the AUT by executing security test instructions 624. Crawl instructions 626 can be executed to crawl the AUT to determine an attack surface of the AUT. Communication instructions 622 can be executed to communicate with the AUT to implement the crawl (e.g., via a network interface card or other communication device).

The attack surface can be attacked by the security test. At 502, the security test can send information about the attack vector, for example, a type associated with the attack vector to a runtime agent working with the AUT. This can be in the form of an identifier associated with information at the runtime agent that can map the identifier to a set of APIs to monitor that are associated with secure activity.

The security test can determine whether a vulnerability is detected in the AUT associated with the attack vector. This can be performed using blackbox testing, gray box testing with the help of the agent, etc. At 504, the security test can determine vulnerability results for the attack vector. These can be added to or be used to generate a vulnerability report or results.

At 506, the security test can request from the runtime agent whether a secure activity has occurred to determine a secure activity is associated with the AUT for the attack vector. The request can be based on a determination that no vulnerability was found for the attack vector. As such, in one example, the secure activity can be added to the vulnerability results if no vulnerability is detected (508). In other examples, the secure activity can be added even if a vulnerability was detected. An indicator can be used to show that the secure activity may have been miss-used. At 510, the security test can modify future attack vectors based on the secure activity as detailed above.

What is claimed is:

1. A method comprising:
monitoring, by a processor, execution of an application under test (AUT) to execute on a server during a dynamic security test of the AUT;
obtaining, by the processor, a predefined listing of a plurality of application programming interfaces (APIs) that are each known to be associated with a defensive mechanism in response to a security threat;
determining, by the processor, that an API from among the plurality of APIs was used during an attack vector of the dynamic security test; and
sending a message to the dynamic security test indicating that an appropriate defensive response to the attack vector was used by the AUT based on the determination that the API was used.

2. The method of claim 1, further comprising:
receiving, from the dynamic security test, a type associated with the attack vector;
identifying the API from among the plurality of APIs based on the type; and
monitoring use of the identified API responsive to receiving the type.

3. The method of claim 2, further comprising:
determining, at the dynamic security test, whether a vulnerability is detected in the AUT associated with the attack vector to generate vulnerability results.

4. The method of claim 3, further comprising:
adding, to the vulnerability results, an indication that the API was used in response to the attack vector.

5. The method of claim 3, wherein when the vulnerability is not detected, modifying, at the dynamic security test, future attack vectors based on a secure activity of the API.

6. The method of claim 1, wherein the attack vector includes an attack to at least one of: Structured Query Language (SQL) injection, cross-site scripting, command injection, insecure randomness, header manipulation, and path manipulation.

7. A system comprising:
a processor; and
a non-transitory computer readable medium on which is stored instructions that when executed by the processor, cause the processor to:
receive, from a security test engine, a request that inquires whether a security activity of an application under test (AUT) occurred during an attack vector of a dynamic security test;
obtain a predefined listing of a plurality of application programming interfaces (APIs) that are each known to be associated with a defensive mechanism in response to a security threat;
determine that an API from among the plurality of APIs was used during the attack vector; and
send a message to the security test engine indicating that an appropriate defensive response to the attack vector was used during the attack vector.

8. The system of claim 7, wherein the system includes the security test engine, and wherein the security test engine is to further send type information associated with the attack vector to a runtime agent executing at the processor, the runtime agent is further to identify and monitor use of the API based on the type information.

9. The system of claim 7, wherein the system includes the security test engine, and wherein the security test engine is further to:
modify future attack vectors based on the indication that the appropriate defensive response was used.

10. The system of claim 9, wherein to modify the future attack vectors, the security test engine is further to:
map a function call by the API with a field that is subject to the attack vector; and
ignore the field in the future attack vectors.

11. The system of claim 7, wherein to send the message, the instructions, when executed by the processor, further cause the device to:
generate a trace response that includes a trace that associates an application request from the attack vector with a response to the application request from the AUT, the message including the trace response.

12. The system of claim 7, wherein the system includes the security test engine, and wherein the security test engine is to further generate a vulnerability report for the dynamic security test.

13. The system of claim 12, wherein to generate the vulnerability report, the security test engine is further to include a reporting that the appropriate defensive response to the attack vector was used.

14. The system of claim 9, wherein to modify the future attack vectors, the security test engine is further to:
identify attack vectors among the future attack vectors that are known to be blocked by use of the API; and
ignore the identified attack vectors.

15. The system of claim 7, wherein the attack vector includes an attack to at least one of: Structured Query Language (SQL) injection, cross-site scripting, command injection, insecure randomness, header manipulation, and path manipulation.

16. A non-transitory machine-readable storage medium storing instructions that, when executed by a processor of a device, cause the device to:
monitor execution of an application under test (AUT) to execute on a server during a dynamic security test of the AUT;
receive an indication that an attack vector is to be performed on the AUT;
obtain a predefined listing of a plurality of application programming interfaces (APIs) that are each known to be associated with a defensive mechanism in response to a security threat;
determine that an API from among the plurality of APIs was used during the attack vector; and
send a message to the dynamic security test indicating that an appropriate defensive response to the attack vector was used by the AUT based on the determination that the API was used.

17. The non-transitory machine-readable storage medium of claim 16, further comprising instructions that, when executed by the processor, cause the device to:
determine that the attack vector was unsuccessful, wherein the message is sent responsive to the determination that the attack vector was unsuccessful.

18. The non-transitory machine-readable storage medium of claim 16, wherein an agent executing on the device monitors the AUT and determines that the API was used.

19. The system of claim 7, wherein the instructions, when executed by the processor, further cause the device to:
receive, from the security test engine, an indication of a type of vulnerability that the attack vector is to attempt to find;
identify a first defensive mechanism that is to respond to the type of vulnerability;
identify the plurality of APIs associated with the first defense mechanism; and
monitor the plurality of APIs.

20. The system of claim 19, wherein to receive the indication of the type of vulnerability, the instructions, when executed by the processor, further cause the device to:
parse a custom header of an application request from the security test engine.

* * * * *